(12) United States Patent
Zhu et al.

(10) Patent No.: US 8,620,366 B2
(45) Date of Patent: Dec. 31, 2013

(54) DATA SYNCHRONIZATION METHOD BETWEEN MOBILE TERMINAL AND SERVER

(75) Inventors: Chunmei Zhu, Beijing (CN); Wei Wu, Beijing (CN); Chuan Yu, Beijing (CN)

(73) Assignee: China Mobile Communications Corporation, Beijing (CN)

( * ) Notice: Subject to any disclaimer, the term of this patent is extended or adjusted under 35 U.S.C. 154(b) by 978 days.

(21) Appl. No.: 12/162,113

(22) PCT Filed: Jan. 22, 2007

(86) PCT No.: PCT/CN2007/000231
§ 371 (c)(1),
(2), (4) Date: Oct. 6, 2008

(87) PCT Pub. No.: WO2007/085183
PCT Pub. Date: Aug. 2, 2007

(65) Prior Publication Data
US 2009/0233591 A1    Sep. 17, 2009

(30) Foreign Application Priority Data
Jan. 25, 2006   (CN) .......................... 2006 1 0002754

(51) Int. Cl.
*H04B 7/00* (2006.01)
*H04B 15/00* (2006.01)
(52) U.S. Cl.
USPC ........... 455/502; 370/350; 707/610; 707/611; 707/612; 707/613; 707/617; 707/618
(58) Field of Classification Search
USPC ........... 455/418, 502; 370/350; 707/610, 611, 707/612, 613, 617, 618
See application file for complete search history.

(56) References Cited

U.S. PATENT DOCUMENTS 6,721,871 B2 *   4/2004   Piispanen et al. .................. 712/1
7,280,817 B2 *   10/2007  Comp ........................... 455/406

(Continued)

FOREIGN PATENT DOCUMENTS

KR   10-2005-0027335 A    3/2005

OTHER PUBLICATIONS

English translation of Abstract of KR10-2005-0027335.

*Primary Examiner* — Liton Miah
(74) *Attorney, Agent, or Firm* — Vierra Magen Marcus LLP (57) ABSTRACT

The present invention relates to a method of data uplink synchronization between a mobile terminal and a server. The server modifies the stored address book data one item by one item. The present invention also relates to a method of data downlink synchronization between a mobile terminal and a server. Before the server sends address book data to the mobile terminal requesting the downlink synchronization, it performs item-by-item adaptation of the address book data according to the item's attribute and parameter supported by the mobile terminal. The present invention relates to another method of data downlink synchronization between a mobile terminal and a server. The mobile terminal, according to the received address book data, modifies the stored address book one item by one item. The present invention implements the operation on each item in the address book, the adaptation to the item's attribute and parameter of the address book according to the specific situation of the mobile terminal, and the mapping to each item according to the meaning of the attribute and parameter so as to effectively avoid information loss caused by inconsistent attributes and parameters and the operations on the record.

13 Claims, 6 Drawing Sheets

(56) References Cited

U.S. PATENT DOCUMENTS

| | | | |
|---|---|---|---|
| 7,317,907 B2* | 1/2008 | Linkert et al. | 455/412.1 |
| 7,359,991 B2* | 4/2008 | Balducci et al. | 709/248 |
| 7,602,765 B2* | 10/2009 | Cho | 370/350 |
| 7,672,978 B2* | 3/2010 | Lehtola et al. | 707/999.2 |
| 8,156,074 B1* | 4/2012 | Multer et al. | 707/610 |
| 2003/0212753 A1 | 11/2003 | Lai | |
| 2004/0025072 A1* | 2/2004 | Mau | 713/400 |
| 2004/0058710 A1* | 3/2004 | Timmins et al. | 455/560 |
| 2004/0093342 A1* | 5/2004 | Arbo et al. | 707/102 |
| 2004/0127205 A1 | 7/2004 | Mahajan | |
| 2004/0136404 A1* | 7/2004 | Mahonen et al. | 370/503 |
| 2004/0142711 A1* | 7/2004 | Mahonen et al. | 455/502 |
| 2004/0203579 A1* | 10/2004 | Comp | 455/406 |
| 2005/0021867 A1* | 1/2005 | Partanen et al. | 709/248 |
| 2005/0138211 A1* | 6/2005 | Cheng | 709/250 |
| 2005/0203905 A1* | 9/2005 | Jung et al. | 707/8 |
| 2006/0003806 A1* | 1/2006 | Weber et al. | 455/561 |
| 2006/0106881 A1* | 5/2006 | Leung et al. | 707/200 |
| 2006/0230349 A1* | 10/2006 | Novak et al. | 715/700 |

\* cited by examiner

DATA SYNCHRONIZATION METHOD BETWEEN MOBILE TERMINAL AND SERVER

CROSS-REFERENCE TO RELATED APPLICATIONS

This application is a national stage of International Application No. PCT/CN2007/000231 filed on Jan. 22, 2007, which claims the priority benefit of China Patent Application No. 200610002754.6 filed on Jan. 25, 2006. The contents of the above identified applications are incorporated by reference herein in their entirety.

FIELD OF THE TECHNOLOGY

The present invention relates to a method of data synchronization, particularly to methods of data uplink synchronization and downlink synchronization between a mobile terminal and a server.

BACKGROUND OF THE INVENTION

Personal information management (PIM) service refers to a service enable a client to keep information in a mobile terminal consistent with a computer or a mobile network server in a mobile or cable way and inquire and manage the information by many kinds of terminals and access means.

The content of PIM generally refers to an address book, scheduling program, a memo pad and so on. The conventional PIM of a mobile terminal user is aimed at a local computer or a PC, which has nothing to do with a network. With continuous increase of a mobile terminal switching rate, it is necessary to provide a PIM service system at the mobile network side in order to enable the mobile terminal user to backup his own PIM data onto a server on the network side via an air channel, or synchronize the PIM information of a server on the network side to a mobile terminal so as to finally achieve the object of synchronizing the personal information on the a mobile terminal and a network server.

Because the address books on a current mobile terminal and a PC all adopts the VCard format defined by the international standard organization. However, in order to ensure the extensibility for the implementation by terminal A manufacturer, the criterion file defines very flexible format content and also defines a lot of fields which can be expanded by the terminal manufacturer. This results in inconsistency of many address book formats of terminal A currently. And the PIM service often has a situation that the content of terminal A is synchronized to the server and then is further synchronized onto terminal B, which results in the problem of address book data loss because of inconsistent formats.

In prior art, a method for solving the problem of data loss because of inconsistent formats is that a server stores the synchronization data of the terminal A and the data which can not be synchronized by the terminal B are till stored in the server. Superficially, this solution solves the problem of address book data loss but there are still many problems left.

Figure 1:
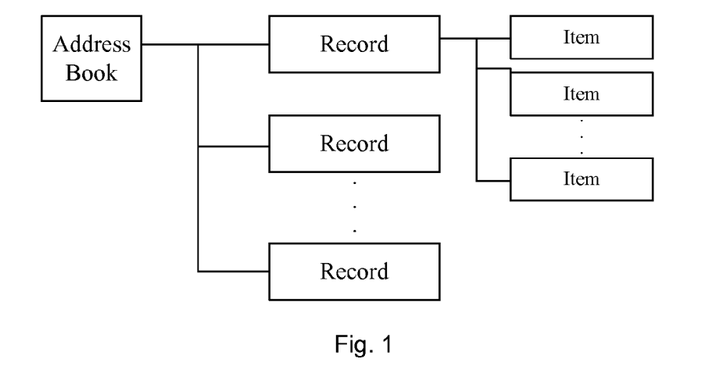
FIG. 1 is a schematic view of the address book format.

For example, an address book of user A is as follows:

Wang Er's mobile phone: XXXX, office phone: XXXX, home phone: XXXX, facsimail number: XXXX Zhang San's mobile phone: XXXX, office phone: XXXX, home phone: XXXX, facsimail number: XXXX Li Si's mobile phone: XXXX, office phone: XXXX, home phone: XXXX, facsimail number: XXXX As shown in FIG. 1, it is a Vcard structure mapped by an address book. The address book comprises many records. Each of the records further comprises many items For example, corresponding to the address book of the user A, all the information of Zhang San is one record in the structure. There are many items in the record, that is, Zhang San's mobile phone, office phone, home phone and facsimail number. In different terminals, the same item may adopts different combination identifier "attribute; parameter". For example, one mobile phone may use an identifier of "TEL; Cell" or "TEL; Voice; Cell", and the items supported by different terminals may also different. The inconsistency of terminal address book formats may produce the problem of information loss as follows:

(1) In different mobile terminal, the same item may use different combination identifiers of "attribute; parameter". For example, in the terminal A, the item of "mobile phone" is identified by "TEL; Cell". In the terminal B, the "mobile phone" is identified by "TEL; Voice; Cell". The user synchronizes the address book of the terminal A onto the server. The server receives the synchronization content and stores the item of the mobile phone by "TEL; Cell". When the user switches to terminal B and requests the server to synchronize the address book to the terminal, the server will still synchronizes the identifier of "TEL; Cell" to the terminal B but the terminal B can not recognize it, which results in information loss. Besides, under this circumstance, the server has to be able to recognize a one-to-many corresponding relationship between the item and all the combinations of "attribute; parameter"; otherwise, the server may also lose user data.

(2) The "attribute; parameter" corresponding to the items of some terminals is formed by adding some additional parameters with no impact to the items behind the "attribute; parameter", such as a PREF parameter representing priority. The existing server does not process these parameters, which results in information loss because no suitable item can be matched or results in incapability of showing it on a website to the user. Although the server has stored the parameter information, when the user switches the terminal B and perform synchronization of the address book once again, the situation that these fields can not be recognized will also appear, which results in information loss.

(3) The items supported by different terminals may also be different. For example, the items supported by the terminal A are: item 1 (mobile phone), item 2 (office phone) and item 3 (home phone). However, the terminal B only supports the item 2 (office phone) and the item 3 (home phone). The user synchronizes the address book onto the server by the terminal A. The server receives and stores the synchronization content. When the user switches to the terminal B, the server will synchronized the item 2 and the item 3 to the user. However, the item 1 is only stored on the server. If the user modifies the item 2 or the item 3 of a record in the address book on the terminal B, the synchronization with the server will be executed. Because the existing synchronization operation aims at the record, the record in the server will be substituted and the item 1 in the original record will also be cleared consequently. When the user switches back to the terminal A and performs data synchronization again, the user can not get the information of the item 1 in the record.

SUMMARY OF THE INVENTION

With regard to the problem of information loss in the prior art, the subject of the present invention is to provide a method of the data synchronization between a mobile terminal and a server. The method performs operation aimed at each item in the address book, performs adaptation according to the mobile terminal's supporting situation for an item's attribute and parameter in an address book, and performs mapping to each item according to the meaning of the item's attribute and parameter so as to effectively avoid information loss caused by inconsistent attributes and parameters and the operations aimed at the record.

In order to implement the above subject, the present invention provides a method of data uplink synchronization between a mobile terminal and a server. The method comprises the following steps:

Step 1, a mobile terminal sends an uplink synchronization request of an address book to a server;

Step 2, the server returns an uplink synchronization request response of the address book to the mobile terminal;

Step 3, the mobile terminal sending to the server address book data needing to be synchronized;

Step 4, the server, according to a number of the mobile terminal, judges whether the address book data of the number exists in the server; if the address book data of the number exist, a step 5 is executed; otherwise, a step 6 is executed;

Step 5, the server, according to the received address book data, modifies the address book data stored in the server one item by one item and executes a step 7;

Step 6, the server stores the received address book data; and

Step 7, the end.

Before the end in the step 7, the method further comprises the following steps:

The server maps the item's information of attribute and parameter in the address book data stored in the server to an item identifier and adds the item identifier to each item. Before mapping the item's information of attribute and parameter in the address book data stored in the server to an item identifier, the server filters additional parameters in the item's information of attribute and parameter.

The step 5 may specifically comprises the following steps:

Step 501, the server judges whether a first record in the received address book data exists in the address book data stored in the server; if it exists, a step 502 is executed; otherwise, a step 508 is executed;

Step 502, the server judges whether a first item of the first record can be mapped to an item in the address book stored in the server; if it can, a step 503 is executed; otherwise, a step 506 is executed;

Step 503, the server extracts content data information from the first item and replaces the content data information of a corresponding item by the content data information;

Step 504, the server judges whether the first item's information of attribute and parameter is the same as the corresponding item's information of attribute and parameter; if they are the same, a step 507 is executed; otherwise, a step 505 is executed;

Step 505, the server, according to the first item's information of attribute and parameter, modifies the corresponding item's information of attribute and parameter and executes the step 507;

Step 506, the server stories the first item under a corresponding record of the address book stored in the server;

Step 507, the server deletes the first item from the first record of the received address book data; judges whether an item still exists in the first record; if the item exists, the step 502 is executed; otherwise, a step 509 is executed;

Step 508, the server stores the first record into the address book stored in the server; and Step 509, the server deletes the first record from the received address book data; judges whether a record still exists in the received address book data; if the record exists, the step 501 is executed; otherwise, the step 7 is executed.

In order to implement the above subject, the present invention further provides a method of data downlink synchronization between a mobile terminal and a server. The method comprises the following steps:

Step 1, a mobile terminal sends to a server a downlink synchronization request of an address book, which carries the number information of the mobile terminal and an address book item supported by the mobile terminal in the information of attribute and parameter;

Step 2, after the server receives the downlink synchronization request, the server, according to the number of the mobile terminal, judges whether the address book data of the number exists in the server; if the address book data exist, a step 3 is executed; otherwise, a step 6 is executed;

Step 3, the server, according to the item's information of attribute and parameter supported by the mobile terminal, modifies each item's information of attribute and parameter in the address book data one item by one item;

Step 4, the server sends the address book data to the mobile terminal;

Step 5, the mobile terminal stores the received address book data; a step 7 is executed;

Step 6, the server returns error information to the mobile terminal; and

Step 7, the end.

The step 3 may specifically comprises the following steps:

Step 301, the server extracts a first record to be modified from the address book;

Step 302, the server extracts a first item to be modified from the first record;

Step 303, the server judges whether the first item's information of attribute and parameter can be mapped to the item's information of attribute and parameter supported by the mobile terminal; if it can, a step 304 is executed; otherwise, a step 305 is executed;

Step 304, the server, according to the item's information of attribute and parameter supported by the mobile terminal, modifies the item's information of attribute and parameter;

Step 305, the server judges whether an item to be modified exists in the current record; if the item exists, the step 302 is executed; otherwise, a step 306 is executed; and Step 306, the server judges whether there is a record to be modified; if there is the record, the step 301 is executed; otherwise, the step 4 is executed.

In the step 304, the server may judges whether the item's information of attribute and parameter is consistent with the item's information of attribute and parameter supported by the mobile terminal at first; if they are consistent, the step 305 is executed; otherwise, according to the item's information of attribute and parameter supported by the mobile terminal, the server modifies the item's information of attribute and parameter and executes the step 305.

The step 4 may specifically comprises the following steps:

The server, according to the item's information of attribute and parameter supported by the mobile terminal, sends an address book item data supported by the mobile terminal in the address book data to the mobile terminal.

The mobile terminal may store the received address book data aimed at an item.

The present invention further provides another method of data downlink synchronization between a mobile terminal and a server. The method comprises the following steps:

Step 1, a mobile terminal sends to a server a downlink synchronization request of an address book data, which carries the number information of the mobile terminal and an item's information of attribute and parameter of the address book supported by the mobile terminal;

Step 2, after the server receives the downlink synchronization request, according to the number of the mobile terminal, the server judges whether an address book data of the number exists in the server; if the address book data exist, a step 3 is executed; otherwise, a step 5 is executed;

Step 3, the server sends the address book data of the number to the mobile terminal;

Step 4, the mobile terminal, according to the received address book data, modifies the address book data stored in the mobile terminal one item by one item and executes a step 6;

Step 5, the server returns error information to the mobile terminal; and

Step 6, the end.

The step 4 specifically comprises the following steps:

Step 401, the mobile terminal extracts a first record from the received address book data;

Step 402, the mobile terminal judges whether the first record exists in the address book of the mobile terminal; if the first record exists, the step 404 is executed; otherwise a step 403 is executed;

Step 403, the mobile terminal establishes a new record in the address book stored in the mobile terminal;

Step 404, the mobile terminal extracts a first item from the first record and judges whether the first item can be mapped to an item of the address book stored in the mobile terminal; if it can, a step 405 is executed; otherwise, a step 406 is executed;

Step 405, the mobile terminal obtains content data from the first item and stores the content data at a corresponding item's content data part in the address book of the mobile terminal;

Step 406, the mobile terminal deletes the first item from the first record and judges whether item data exist in the first record; if the item data exist, the step 404 is executed; otherwise, a step 407 is executed; and step 407, the mobile terminal deletes the first record from the received address book data and judges whether record data exist in the received address book data; if the record data exist, the step 401 is executed; otherwise, the end.

The technical solution of the present invention implements the operation aimed at each item in the address book, the adaptation for the item's attribute and parameter of the address book according to the specific situation of the mobile terminal, and the mapping for each item according to the meaning of the attribute and parameter so as to effectively avoid information loss caused by inconsistent attributes and parameters and the operations aimed at the record.

The present invention will be described in more detail with reference to the drawings and embodiments.

DETAILED DESCRIPTION OF THE PREFERRED EMBODIMENTS

The present invention performs uplink synchronization and downlink synchronization of the address book aimed at the item so as to avoid data loss caused by the synchronization.

Figure 2:
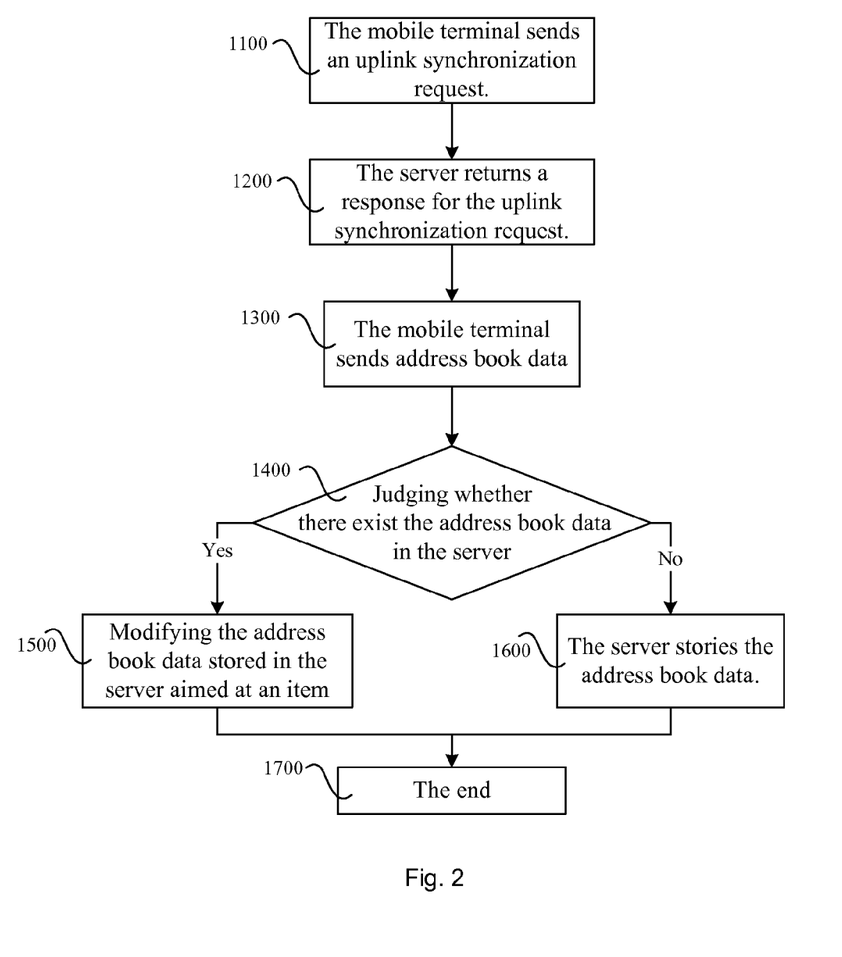
FIG. 2 is a flowchart illustrating the method of the data uplink synchronization between the mobile terminal and the server in accordance with the present invention.

As shown in FIG. 2, it is a flowchart illustrating the method of the data uplink synchronization between the mobile terminal and the server in accordance with the present invention. The method comprises following steps:

Step 1100, the mobile terminal sends an uplink synchronization request to the server.

The synchronization between the mobile terminal and the server may be divided into uplink synchronization and downlink synchronization. The uplink synchronization is to backup the information of the mobile terminal onto the server. The downlink synchronization is to store the information of the server onto the mobile terminal. The user may initiate the uplink synchronization request initiatively or may be reminded to initiate the uplink synchronization request by the terminal when the user modifies the address book on the terminal.

Step 1200, the server returns a response of the uplink synchronization request to the mobile terminal;

The server may perform authentication on the mobile terminal sending the synchronization request. If the authentication is passed, the server sends the response of the uplink synchronization request to the mobile terminal. If the authentication is not passed, the server sends an error prompt.

Figure 3:
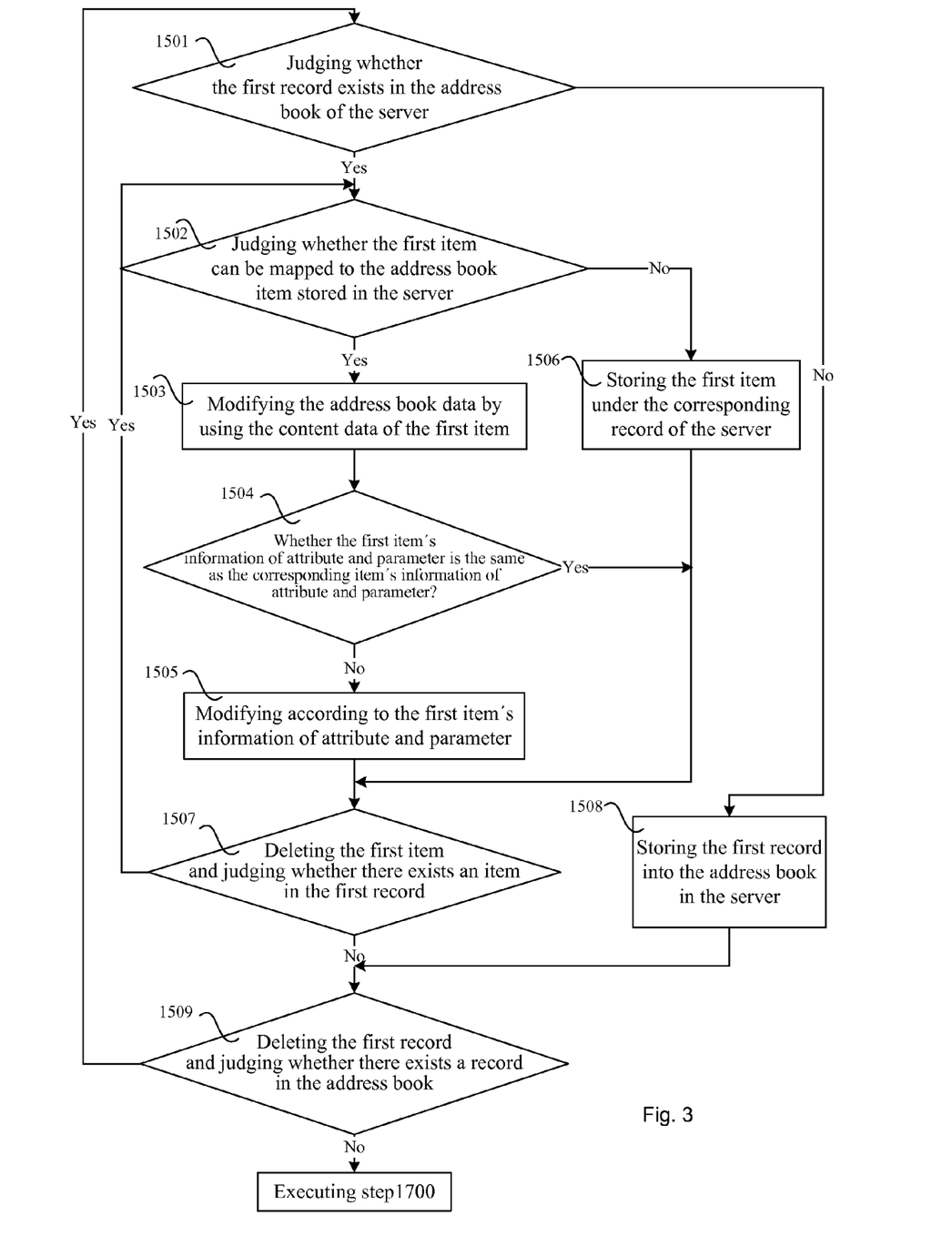
FIG. 3 is a flowchart illustrating a specific embodiment of the method for the server to modify the address book data one item by one item in the method of the data uplink synchronization between the mobile terminal and the server in accordance with the present invention.

Step 1300, the mobile terminal sends address book data needing synchronization to the server;

Step 1400, the server judges whether the address book data of the mobile terminal exist in the server according to the number of the mobile terminal. If the address book data exist, execute Step 1500; otherwise, execute Step 1600;

Step 1500, the server modifies the address book data stored in the server one item by one item according to the received address book data, and execute step 1700;

The address book exists in the server. In order to avoid data loss, each item in the address book is modified. As shown in FIG. 3, it is a flowchart illustrating the method for the server to modify the address book data one item by one item in accordance with a specific embodiment. The method comprises following steps:

Step 1501, the server judges whether the first record in the received address book data exist in the address book data stored in the server. If the received address book data exist in the address book data, execute step 1502; otherwise, execute step 1508.

Step 1502, the server judges whether the first item of the first record can be mapped to the corresponding item in the address book data stored in the server. If the first item can be mapped to the corresponding item, execute step 1503; otherwise, execute step 1506.

The server stores various identification means defined by the International Standard Organization and classified according to the meanings as follows:

"mobile phone" corresponds to "TEL; Cell" or "TEL; Voice; Cell"; (TEL is an attribute. The Voice and Cell are parameter identifiers demonstrating that the item is a mobile phone of someone)

"office phone" corresponds to "TEL; Work" or "TEL; Voice; Work";

"home phone" corresponds to "TEL; Home" or "TEL; Voice; Home"

"phone number" corresponds to "TEL" or "TEL; Voice";

"email" corresponds to "EMAIL; INTERNET" or "EMAIL".

When the server judges whether it can be mapped to the corresponding item, the server will perform searching according to the information of attribute and parameter. For example, if the information of attribute and parameter of one item under the current record is "TEL; Work", the server will search the item with the information of attribute and parameter to be "TEL; Work" or "TEL; Voice; Work" under the corresponding record in the stored address book.

For the existing item, it is needed to modify the data in the server according to the received data. The modification may be performed by following two manners. One manner is to perform complete replacement for the item which is fast but may cause information loss because the formats defined by the International Standard Organization are very flexible. A terminal adds an additional parameter after a standard item identified, such as a PREF parameter indicating priority. When the server performs the complete replacement for the item, if there is no additional parameter information in the first item, the information originally stored in the server will be lost. Therefore, another manner for modification is adopted. The modification is performed on the information of attributes and parameters and the content data of item respectively.

Step 1503, the server extracts content data information from the first item and replaces content data information of the corresponding item by the content data information;

The content data information of the item refers to the specific data content of the item, such as a specific phone number "12345678900".

Step 1504, the server judges whether the information of attribute and parameter of the first item is the same as the information of attribute and parameter of the corresponding item. If they are the same, execute step 1507; otherwise, execute step 1505.

Step 1505, the server modifies the information of attribute and parameter of the corresponding item according to the information of attribute and parameter of the first item and executes step 1507.

When the information of attribute and parameter is modified, if the corresponding item in the server has an additional parameter but there is no additional parameter in the first item, the additional parameter will still be preserved. If the corresponding item in the server has no additional parameter but there is an additional parameter in the first item, the additional parameter will be stored into the corresponding item. If the additional parameter of the corresponding item in the server is different from the additional parameter of the first item, the additional parameter in the first item will still be stored into the corresponding item of the server. For example, the attribute and parameter of the item stored in the server are "TEL; Voice; Work" and "PREF", where the "PREF" represents the priority of a contact person's work phone. The attribute and parameter of the first item are "TEL; Work". The "TEL; Voice; Work" are modified to be "TEL; Work" but the additional parameter "PREF" keeps unchanged. When the attribute parameter of the first item has an additional parameter "PREF" but the item stored in the server does not has the additional parameter, the server will store the parameter into the corresponding item.

Step 1506, the server stores the first item under the corresponding record of the address book stored in the server.

If there is not the corresponding item information in the server, the server may directly store the item.

Step 1507, the server deletes the first item from the first record and judges whether an item exists in the first record. If the item exists, execute the step 1502; otherwise, execute step 1509.

Step 1508, the server stores the first record into the address book stored in the server.

When there is no the first record in the serve, the record may be directly stored.

Step 1509, the server deletes the first record from the received address book data and judges whether a record exists in the received address book data. If the record exists, execute step 1501; otherwise, execute step 1700.

Step 1600, the server stores the received address book data;

If there is not the corresponding address book in the server, the received address book data may be directly stored.

Step 1700, the end.

The above-mentioned steps finish backuping the address book onto the server. When uplink synchronization is performed, in order to avoid user information loss caused by modifying the record, the address book data on the server are updated aimed at the item so as to effectively avoid data loss during uplink synchronization of address book data.

In order to facilitate the user to check the address book, the user may log on the server via the Internet, check and modify the address book. When the user checks the address book via the Internet, it is necessary to show the Chinese identifier corresponding to the information of attribute and parameter of each item and the specific data content of the item. Therefore, each item should be mapped. The information of attribute and parameter of each item is mapped to the corresponding item identifier and an item identifier is added for each item so that the user can clearly see whether the phone is the contact person's office phone, mobile phone or home phone when the user checks the address book via the Internet but the information of attribute parameter will not be shown. For example, if the attribute parameters of the item are "TEL; WORK", they will be mapped to be "office phone". The item identifier may be in forms of text, figure and so on.

During performing parameter mapping, if all the attributes and parameters in an item are mapped, there may be the situation that no corresponding item identifier can be found for additional parameters may exist. Therefore, before performing the parameter mapping, the information of attribute and parameter is processed to filter the additional parameters firstly. Then, the attribute and parameter after filtering are matched and mapped so as to display the information on a webpage to the user. For example, an identifier reported by the terminal is "TEL; CELL; HOME; PREF". Then, when the server performs parameter mapping, the server firstly filters the additional parameters "PREF" and then performs matching and mapping to the left "TEL; CELL; HOME" so that "home phone" is mapped. Accordingly, the user may see all the records in the address book by visiting the server via the Internet. The address book stored on the server still stores the additional parameters to avoid data loss.

Figure 4:
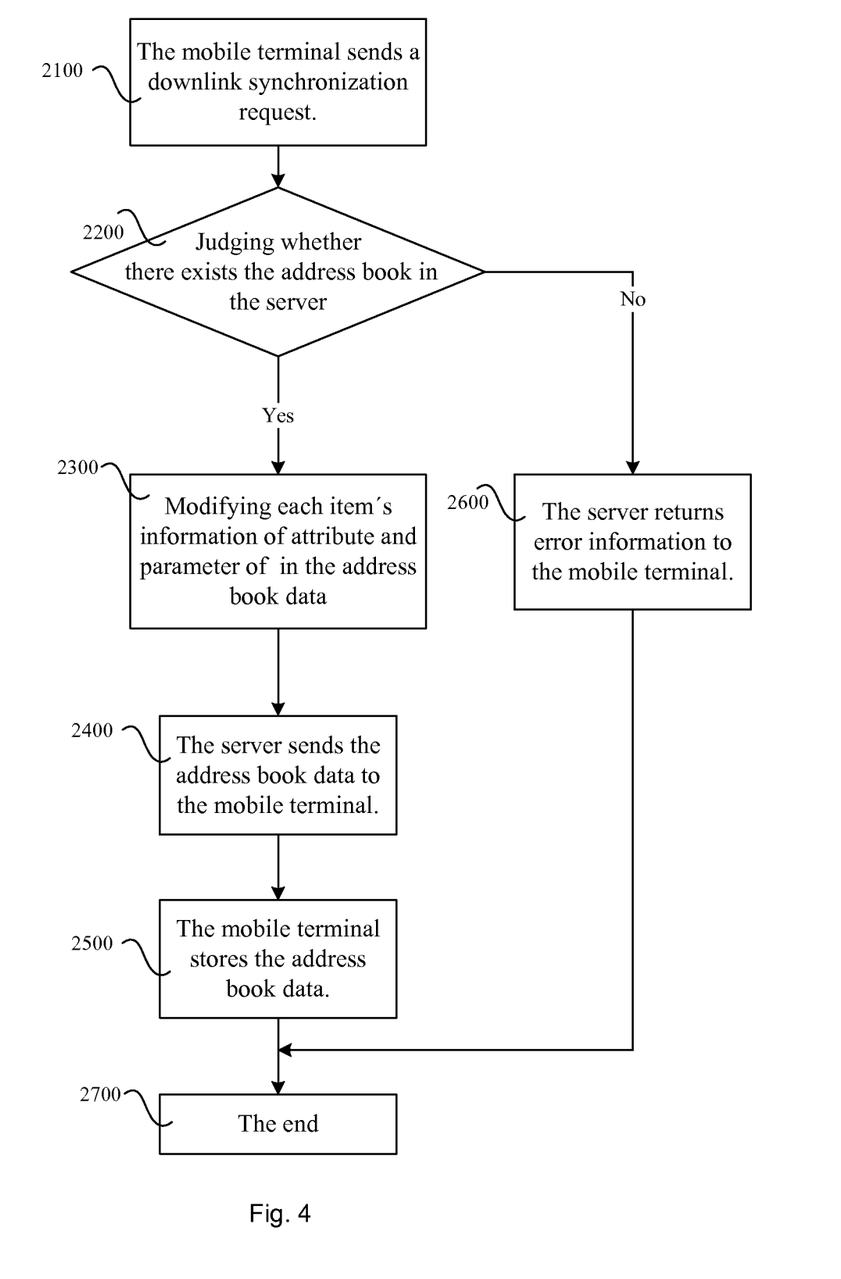
FIG. 4 is a flowchart illustrating the method of data downlink synchronization between a mobile terminal and a server in accordance with the present invention.

As shown in FIG. 4, it is a flowchart illustrating the method of data downlink synchronization between a mobile terminal and a server in accordance with the present invention. This method includes the following steps:

Step 2100, the mobile terminal sends a downlink synchronization request of the address book to the server. The downlink synchronization request carries the information of attribute and parameter in the address book item supported by the mobile terminal that sends the downlink synchronization request.

The user may initiate the downlink synchronization request initiatively via a mobile terminal and may also be reminded to initiate the downlink synchronization request by the network side when the user modifies the address book on the server via the Internet.

Step 2200, after the server receives the downlink synchronization request of the address book, according to a number of the mobile terminal, the server judges whether the address book data of the number exist in the server. If the address book data exist, execute step 2300; otherwise, execute step 2600.

Step 2300, the server, according to the information of attribute and parameter in the item supported by the mobile terminal, modifies the information of attribute and parameter of each item in the address book data one item by one item.

Figure 5:
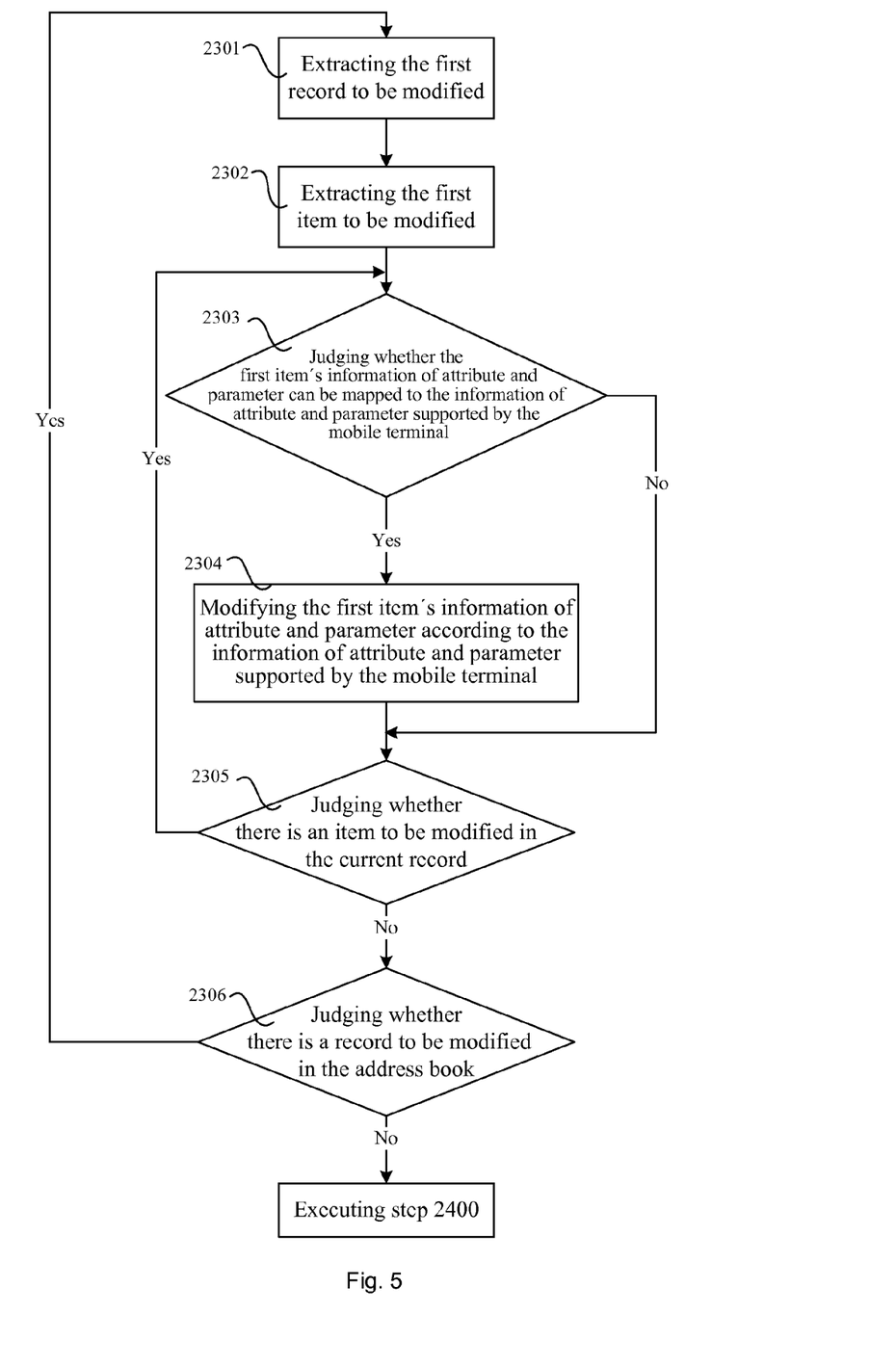
FIG. 5 is a flowchart illustrating one embodiment of the method for the server to modify the address book data one item by one item in the method of data downlink synchronization between the mobile terminal and the server in accordance with the present invention.

As shown in FIG. 5, it is a flowchart illustrating one embodiment of the method for the server to modify the address book data one item by one item. The embodiment includes the following steps:

Step 2301, the server extracts the first record to be modified from the address book.

Step 2302, the server extracts the first item to be modified from the first record.

Step 2303, the server judges whether the information of attribute and parameter of the first item can be mapped to be the information of attribute and parameter in the item supported by the mobile terminal. If it can, execute step 2304; otherwise, execute step 2305;

Due to the diversity of the formats of attributes and parameters of the item, the mobile terminal initiating the downlink synchronization request may not support the identifier format of the address book stored in the server. Therefore, it is needed to modify server's address book according to the information of attribute and parameter of the item supported by the mobile terminal. "being able to be mapped to the information of attribute and parameter of the item supported by the mobile terminal" indicates that there is the information of attribute and parameter in the mobile terminal which has the same meaning as the information of attribute and parameter in the current item. Therefore, the server's address book data may be modified according to the format supported by the mobile terminal. "Being unable to be mapped" indicates the mobile terminal doses not have the information of attribute and parameter which has the same meaning as the information of attribute and parameter of the current item. Therefore, the modification is not performed. For example, the information of attribute and parameter of the current item is "TEL; CELL; HOME; X-MOT-RINGID" which means that the home phone has a dedicated ring tone and the item's content data is an identifier (which may be the information of a ring tone name or a ring tone storage location and so on) of the ring tone set by the home phone in the current record. However, the mobile terminal does not support setting a dedicated ring tone for the home phone so that the current item can not be mapped to be the information of attribute and parameter supported by the mobile terminal. An extension parameter may change the item's meaning. "TEL; CELL; HOME; X-MOT-RINGID" is an identifier of a home phone ring tone and "TEL; CELL; HOME" is a home phone. Therefore, the attribute and parameter of an item with an extension parameter may be treated as an item with inconsistent meanings. The additional parameter has no impact on the item's content data. "TEL; CELL" and "TEL; CELL; PREF" are both mobile phones. Their meanings are insistent. Only the latter has a priority parameter. The additional parameters may be filtered firstly and then the mapping is performed.

Step 2304, the server modifies the information of attribute and parameter of the item in the address book data stored in the server according to the information of attribute and parameter of the item supported by the mobile terminal;

For example, the address book stored in the server adopts the format of "TEL; Cell" but the format supported by the mobile terminal is "TEL; Voice; Cell". According to the stored various attribute formats and parameter formats, the server may search which item's information of attribute and parameter supported by the mobile terminal has the same meaning as the information of attribute and parameter of the current item in the server address book. The address book data is modified according to the corresponding format supported by the mobile terminal. For example, "TEL; Cell" in the server address book is modified to be "TEL; Voice; Cell". When the item and attribute parameter of the server has additional parameters which are not supported by the mobile terminal, the server shall preserve the stored additional parameters. For example, the current item adopts "TEL; Cell; PREF" but the mobile terminal supports "TEL; Voice; Cell". Then the "TEL; Cell; PREF" is modified to be "TEL; Voice; Cell; PREF" to ensure no data loss.

In order to avoid unnecessary modification for parameters, firstly, it may be judged whether the information of attribute and parameter of the current item is consistent with the corresponding information of attribute and parameter supported by the mobile terminal, that is, judge whether the format of the information of attribute and parameter keeps the same after filtering additional parameters. If it keeps the same, no modification is needed. If it is different, modification shall be performed according to the above-mentioned method.

Step 2305, the server judges whether there is an item to be modified in the current record. If there is one, execute the step 2302; otherwise, execute step 2306.

Step 2306, the server judges whether there is a record to be modified. If there is one, execute the step 2301; otherwise, execute step 2400.

Step 2400, the server sends the address book data to the mobile terminal.

Step 2500, the mobile terminal stores the received address book data, and executes step 2700.

The server stores address book data one item by one item during the uplink synchronization. Similarly, during the downlink synchronization, the mobile terminal may also store the address book data for each item so as to avoid information loss caused by modification for the record.

Step 2600, the server returns error information to the mobile terminal.

Step 2700, the end.

The above-mentioned of data downlink synchronization method between a mobile terminal and a server implements modification on the address book according to the identifier format supported by the mobile terminal when the mobile terminal initiating a downlink synchronization request does not support the identifier format of the address book stored in the server so as to effectively avoid information loss caused by unmatched attributes and parameters.

During performing the downlink synchronization, the mobile terminal initiating the downlink synchronization may not support additional parameters. Under this circumstance, there is no need to send the additional parameters to the mobile terminal. Therefore, when sending the address book information to the mobile terminal initiating the downlink synchronization request, the server may send each item data in the address book supported by the mobile terminal to the mobile terminal sending the downlink synchronization request according to the information of attribute and parameter of the item supported by the address book. For example, when the mobile terminal does not support additional parameters, the server only sends the data except the additional parameters in the item data. For another example, when the mobile terminal does not support extension parameters, the server will not send any extension parameter item so as to reduce unnecessary data transmission.

The mobile terminal may support many repeated items. For example, a mobile terminal allows a user to input many mobile phone numbers for one contact person. When uplink synchronization of address book is performed, the server may perform storing and updating for the address book according to the above manners. When downlink synchronization of the address book is performed, the number of repeated items supported by the mobile terminal may be different from the number of repeated items of the address book in the server. When the repeated items supported by the mobile terminal are much more, the address book is sent to the mobile terminal according to the above steps. When the repeated items supported by the mobile terminal are much less, adaptation and sending are performed according to storing order. For example, if a contact person in the address book of the server has three mobile phone numbers but the mobile terminal initiating a downlink synchronization request only supports one mobile phone number, the contact person's first mobile phone number in the address book of the server is adapted and sent. When the address book is allowed to store many items with the same meaning, there is always a priority parameter. Therefore, the item may be chosen according to the priority parameter to be adapted and sent.

In the address book of one number, the server stores all the items of the mobile terminal which has used the number. Because more and more users tend to change terminals, there are more and more user data are stored on the server. In order to prevent fragment information from taking server space for a long time, the server needs to give a certain life period to the data. After the life period expires, the server will notify the user to clean up the data. If the user can not delete overtime data in time, the server will delete the data.

Figure 6:
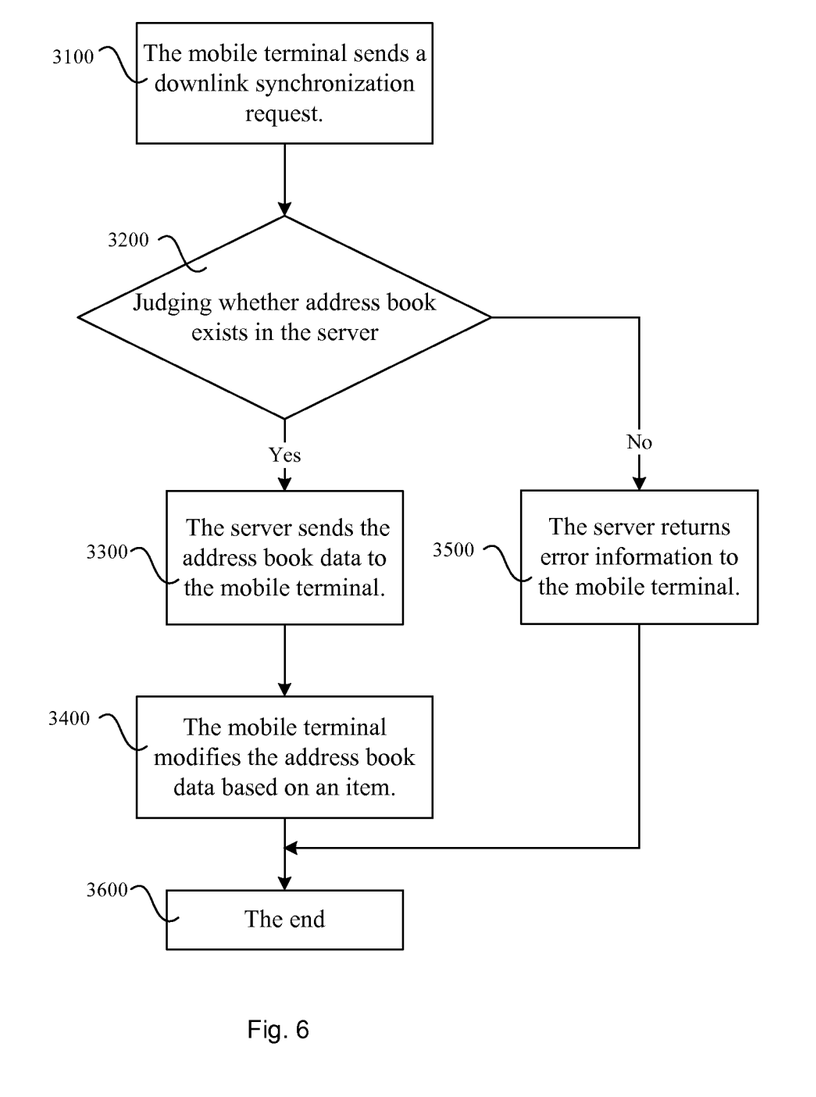
FIG. 6 is a flowchart illustrating another method of data downlink synchronization between the mobile terminal and the server in accordance with the present invention.

In the process of downlink synchronization, the adaptation on the item identifier may also be implemented by the mobile terminal. As shown in FIG. 6, it is a flowchart illustrating another method of data downlink synchronization between the mobile terminal and the server in accordance with the present invention. The present method comprises the following steps:

Step 3100, the mobile terminal sends to the server a downlink synchronization request of the address book. The downlink synchronization request carries the number information of the mobile terminal and the information of attribute and parameter of the address book item supported.

The user may initiate the downlink synchronization request initiatively via a mobile terminal and may also be reminded to initiate the downlink synchronization request by the network side when the user modifies the address book on the server via the Internet.

Step 3200, after the server received the downlink synchronization request, the server judges whether the address book data of the number exist in the server according to the number of the mobile terminal. If the address book data of the number exist in the server, execute step 3300; otherwise, execute step 3500.

Step 3300, the server sends the address book data of the number to the mobile terminal.

Step 3400, the mobile terminal modifies the address book data stored in the mobile terminal one item by one item according to the received address book data. The modification is performed on the item. Execute step 3600.

Step 3500, the server returns error information to the mobile terminal.

Step 3600, the end.

Figure 7:
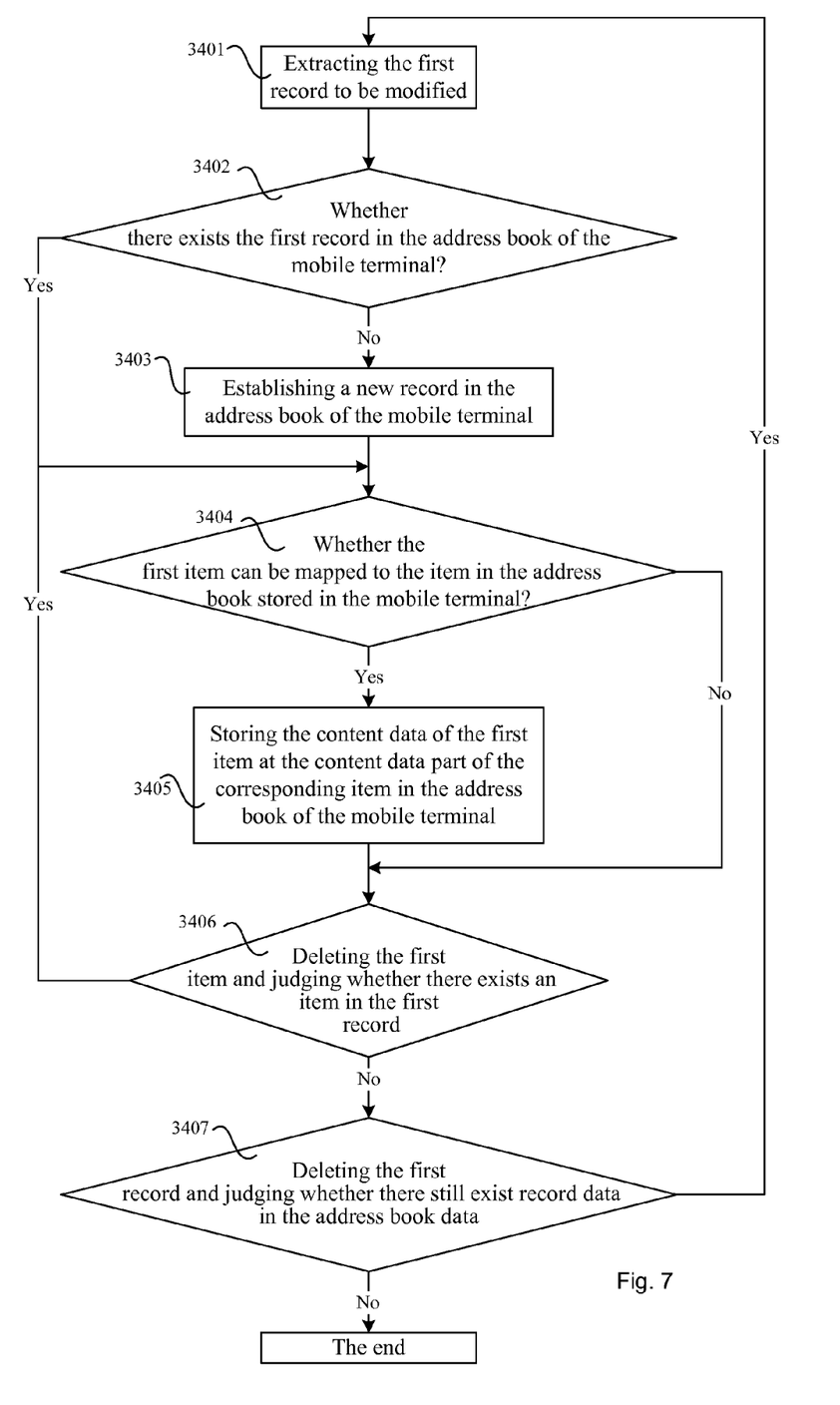
FIG. 7 is a flowchart illustrating another embodiment of the method for the mobile terminal to modify the address book data one item by one item in the method of the data downlink synchronization between the mobile terminal and the server in accordance with the present invention.

When the mobile terminal modifies the address book data, the mobile terminal performs operation on each item. As shown in FIG. 7, it is a flowchart illustrating an embodiment of the method for modifying address book data one item by one item for the mobile terminal. The method comprises the following steps:

Step 3401, the mobile terminal extracts the first record from the received address book data.

Step 3402, the mobile terminal judges whether the first record exist in the address book of the mobile terminal. If the first record exists, execute step 3404; otherwise, execute step 3403.

The judgment is performed according to the identifier information of the record, e.g. judging whether the "name" of records is the same.

Step 3403, the mobile terminal establishes a new record in the stored address book.

When the first record does not exist in the mobile terminal, the mobile terminal establishes a record according to the identifier information of the first record. After the mobile terminal established the record, the record will have each item supported by the mobile terminal. However, the item is incomplete which only has the information of attribute and parameter but no content data.

Step 3404, the mobile terminal extracts the first item from the first record. The mobile terminal judges whether the first item can be mapped to the item in the address book stored in the mobile terminal. If the first item can be mapped, executes step 3405; otherwise, execute step 3406;

Various identification manners defined by the International Standard Organization are stored in the mobile terminal. According to the information of attribute and parameter of the extracted item, the mobile terminal searches whether the corresponding item under the corresponding record exist in the address book of the mobile terminal. "mapping" refers to that the items have the same meaning. For example, the meanings of "TEL; Cell" and "TEL; Voice; Cell" are the same. They both mean mobile phone. The meanings of "TEL; Cell; PREF" and "TEL; Voice; Cell" are also considered to be the same.

If "can" which means the mobile terminal has items with the same meaning, the content data is directly stored to the corresponding item. If "can be mapped" which means the mobile terminal does not support the item with the meaning, the storing will not be performed.

Step 3405, the mobile terminal obtains the content data from the first item and stores the content data at the content data part of the corresponding item in the address book of the mobile terminal.

The corresponding item in the address book of the mobile terminal may has data at the content data part or may be empty. When the item has the data, the content data of the first item may be used to substitute the content data of the corresponding item in the mobile terminal. When the item is empty, the content data of the first item are directly stored at the content data part of the corresponding item in the mobile terminal.

Step 3406, the mobile terminal deletes the first item from the first record and judges whether item data exist in the first record. If the item data exist, execute the step 3404; otherwise, execute the step 3407.

Step 3407, the mobile terminal deletes the first record from the received address book data and judges whether record data exist in the received address book data. If the record data exist, execute the step 3401; otherwise, end.

The mobile terminal modifies the address book one item by one item and performs parameter mapping during the modification so as to avoid the problem of information loss caused by the operations one record by one record and inconsistent attributes and parameters.

Finally, it should be understood that the above embodiments are only used to explain, but not to limit the technical solution of the present invention. In despite of the detailed description of the present invention with referring to above preferred embodiments, it should be understood that various modifications, changes or equivalent replacements can be made by those skilled in the art without departing from the spirit and scope of the present invention and covered in the claims of the present invention.

What is claimed is:

1. A method of data uplink synchronization between a mobile terminal and a server, comprising:
    step 1, a mobile terminal sending an uplink synchronization request of an address book to a server;
    step 2, the server returning an uplink synchronization request response of the address book to the mobile terminal;
    step 3, the mobile terminal sending to the server address book data needing to be synchronized;
    step 4, the server, according to a number of the mobile terminal, judging whether the address book data of the number exists in the server; if and only if the address book data of the number exist, executing a step 5; if and only if the address book data of the number does not exist, executing a step 6;
    step 5, the server, according to the received address book data, modifying the address book data stored in the server one item by one item, wherein the address book data comprises many records and each of the records further comprises many items, and executing a step 7;
    step 6, the server storing the received address book data; and
    step 7, ending;
    wherein the step 5 comprises:
    step 501, the server judging whether a first record in the received address book data exists in the address book data stored in the server; if it exists, executing a step 502; otherwise, executing a step 508;
    step 502, the server judging whether a first item of the first record can be mapped to an item in the address book stored in the server; if it can, executing a step 503; otherwise, executing a step 506;
    step 503, the server extracting content data information from the first item and replacing content data information of a corresponding item by the content data information;
    step 504, the server judging whether the first item's information of attribute and parameter is the same as the corresponding item's information of attribute and parameter; if they are the same, executing a step 507; otherwise, executing a step 505;
    step 505, the server, according to the first item's information of attribute and parameter, modifying the corresponding item's information of attribute and parameter; executing the step 507;
    step 506, the server storing the first item under a corresponding record of the address book stored in the server;
    step 507, the server deleting the first item from the first record of the received address book data; judging whether an item still exists in the first record; if the item exists, executing the step 502; otherwise, executing a step 509;
    step 508, the server storing the first record into the address book stored in the server; and
    step 509, the server deleting the first record from the received address book data; judging whether a record still exists in the received address book data; if the record exists, executing the step 501; otherwise, executing the step 7.

2. The method according to claim 1, before the ending in the step 7, further comprising:
    the server mapping the item's information of attribute and parameter in the address book data stored in the server to an item identifier; adding the item identifier to each item.

3. The method according to claim 2, wherein before mapping the item's information of attribute and parameter in the address book data stored in the server to an item identifier, the server filters additional parameters in the item's information of attribute and parameter.

4. A method of data downlink synchronization method between a mobile terminal and a server, comprising:
    step 1, a mobile terminal sending to a server a downlink synchronization request of an address book, which carries the number information of the mobile terminal and an address book item supported by the mobile terminal in the information of attribute and parameter;
    step 2, after the server receives the downlink synchronization request, the server, according to the number of the mobile terminal, judging whether the address book data of the number exists in the server; if and only if the address book data exist, executing a step 3; if and only if the address book does not exist, executing a step 6;
    step 3, the server, according to the item's information of attribute and parameter supported by the mobile terminal, modifying each item's information of attribute and parameter in the address book data one item by one item, wherein the address book data comprises many records and each of the records further comprises many items;
    step 4, the server sending the address book data to the mobile terminal;
    step 5, the mobile terminal storing the received address book data; executing a step 7;
    step 6, the server returning error information to the mobile terminal; and
    step 7, ending;
    wherein the step 3 comprises:
    step 301, the server extracting a first record to be modified from the address book;
    step 302, the server extracting a first item to be modified from the first record;
    step 303, the server judging whether the first item's information of attribute and parameter can be mapped to the item's information of attribute and parameter supported by the mobile terminal; if it can, executing a step 304; otherwise, executing a step 305;

step 304, the server, according to the item's information of attribute and parameter supported by the mobile terminal, modifying the item's information of attribute and parameter;

step 305, the server judging whether an item to be modified exists in the current record; if the item exists, executing the step 302; otherwise, executing a step 306; and step 306, the server judging whether there is a record to be modified; if there is the record, executing the step 301; otherwise, executing the step 4.

5. The method according to claim 4, wherein the step 304 specifically comprises:

the server judging whether the item's information of attribute and parameter is consistent with the item's information of attribute and parameter supported by the mobile terminal; if they are consistent, executing the step 305; otherwise, according to the item's information of attribute and parameter supported by the mobile terminal, modifying the item's information of attribute and parameter; and executing the step 305.

6. The method according to claim 5, wherein in the step 5, the mobile terminal stores the received address book data aimed at an item.

7. The method according to claim 4, wherein before the step 1, the server modifies the address book according to an user's operation via the Internet and sends information to the corresponding mobile terminal for prompting the user to perform downlink synchronization of the address book; the user inputs a downlink synchronization instruction.

8. The method according to claim 7, wherein in the step 5, the mobile terminal stores the received address book data aimed at an item.

9. The method according to claim 4, wherein the step 4 specifically comprises:

the server, according to the item's information of attribute and parameter supported by the mobile terminal, sending an address book item data supported by the mobile terminal in the address book data to the mobile terminal.

10. The method according to claim 9, wherein in the step 5, the mobile terminal stores the received address book data aimed at an item.

11. The method according to claim 4, wherein in the step 5, the mobile terminal stores the received address book data aimed at an item.

12. A method of data downlink synchronization between a mobile terminal and a server, comprising:

step 1, a mobile terminal sending to a server a downlink synchronization request of an address book data, which carries the number information of the mobile terminal and an item's information of attribute and parameter of the address book supported by the mobile terminal;

step 2, after the server receives the downlink synchronization request, according to the number of the mobile terminal, judging whether an address book data of the number exists in the server; if and only if the address book data exist, executing a step 3; if and only if the address book data does not exist, executing a step 5;

step 3, the server sending the address book data of the number to the mobile terminal;

step 4, the mobile terminal, according to the received address book data, modifying the address book data stored in the mobile terminal one item by one item, wherein the address book data comprises many records and each of the records further comprises many items; executing a step 6;

step 5, the server returning error information to the mobile terminal; and step 6, ending;

wherein the step 4 comprises:

step 401, the mobile terminal extracting a first record from the received address book data;

step 402, the mobile terminal judging whether the first record exists in the address book of the mobile terminal; if the first record exists, executing the step 404; otherwise executing a step 403;

step 403, the mobile terminal establishing a new record in the address book stored in the mobile terminal;

step 404, the mobile terminal extracting a first item from the first record and judging whether the first item can be mapped to an item of the address book stored in the mobile terminal; if it can, executing a step 405; otherwise, executing a step 406;

step 405, the mobile terminal obtaining content data from the first item and storing the content data at a corresponding item's content data part in the address book of the mobile terminal;

step 406, the mobile terminal deleting the first item from the first record and judging whether item data exist in the first record; if the item data exist, executing the step 404; otherwise, executing a step 407; and step 407, the mobile terminal deleting the first record from the received address book data and judging whether record data exist in the received address book data; if the record data exist, executing the step 401; otherwise, ending.

13. The method according to claim 12, wherein before the step 1, the server modifies the address book according to a user's operation via the Internet and sends information to the corresponding mobile terminal for prompting the user to perform downlink synchronization of the address book; the user inputs a downlink synchronization instruction.

* * * * *